US007206257B1

(12) United States Patent
Meng

(10) Patent No.: US 7,206,257 B1

(45) Date of Patent: Apr. 17, 2007

(54) ACOUSTIC REMOTE CAVIATION AS A DESTRUCTION DEVICE

(75) Inventor: James C. S. Meng, Poulsbo, WA (US)

(73) Assignee: The United States of America represented by the Secretary of the Navy, Washington, DC (US)

( * ) Notice: Subject to any disclaimer, the term of this patent is extended or adjusted under 35 U.S.C. 154(b) by 766 days.

(21) Appl. No.: 10/655,632

(22) Filed: Sep. 2, 2003

(51) Int. Cl.
*H04B 1/02* (2006.01)

(52) U.S. Cl. .......................................... 367/137; 361/1

(58) Field of Classification Search ................ 367/137, 367/1

See application file for complete search history.

(56) References Cited

U.S. PATENT DOCUMENTS

| | | | | |
|---|---|---|---|---|
| 4,244,749 | A * | 1/1981 | Sachs et al. | 367/154 |
| 4,681,264 | A * | 7/1987 | Johnson, Jr. | 239/589.1 |
| 5,035,363 | A * | 7/1991 | Somoza | 241/1 |
| 5,209,221 | A * | 5/1993 | Riedlinger | 601/2 |
| 5,681,396 | A * | 10/1997 | Madanshetty | 134/1.3 |
| 5,827,204 | A * | 10/1998 | Grandia et al. | 601/2 |
| 2004/0059265 | A1* | 3/2004 | Candy et al. | 601/2 |

* cited by examiner

*Primary Examiner*—Dan Pihulic

(74) *Attorney, Agent, or Firm*—James M. Kasischke; Michael P. Stanley; Jean-Paul A. Nasser

(57) ABSTRACT

A method is disclosed of generating a predetermined field of cavitation around a remote target in an underwater environment. The method includes the steps of identifying a remote target location, generating at least two acoustic beams, each at a high power output, from an underwater acoustic source, and controlling the generated acoustic beams to intersect with each other at the remote target location and thereby create a destructive cavitation field at the intersection of the beams. The acoustic source and target can be located in unconfined underwater space and at a distance of at least 100 m apart.

16 Claims, 3 Drawing Sheets

ACOUSTIC REMOTE CAVIATION AS A DESTRUCTION DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to an environmentally clean device to eliminate or destroy unwanted underwater objects remotely without using explosive materials. More particularly, the invention uses a general-purpose active sonar array to remotely eliminate or destroy unwanted underwater objects.

(2) Description of the Prior Art

The current art for the underwater destruction of unwanted objects is as varied as the devices to be destroyed.

The following patents, for example, disclose a generating a cavitation area at a very close range and/or within an enclosed space and at high frequencies, but do not disclose generating a cavitation in an essentially free water space and at relatively low frequencies in order to destroy a target within that free space.

U.S. Pat. No. 4,244,749 to Sachs et al.;

U.S. Pat. No. 4,681,264 to Johnson, Jr.

U.S. Pat. No. 5,035,363 to Somoza;

U.S. Pat. No. 5,209,221 to Reidlinger;

U.S. Pat. No. 5,681,396 to Madanshetty; and

U.S. Pat. No. 5,827,204 to Grandia et al.

Specifically, Sachs et al. discloses removal of biofouling from the external surfaces of spaced apart pipes of a heat exchanger which are in contact with a liquid by positioning a plurality of ultrasonic transducers between the pipes and operating the transducers at sufficient power levels to cause cavitation within the liquid to effect the desired cleaning action. The transducers are arranged in a planar configuration to produce bi-directional acoustic radiation. Various types of instrumentation are provided for determining the extent of biofouling and effectiveness of cleaning as well as for monitoring transducer operation parameters.

The patent to Johnson, Jr. discloses a process and apparatus for enhancing the erosive intensity of a high velocity liquid jet when the jet is impacted against a surface for cutting, cleaning, drilling or otherwise acting on the surface. A preferred method comprises the steps of forming a high velocity liquid jet, oscillating the velocity of the jet at a preferred Strouhal number, and impinging the pulsed jet against a solid surface to be eroded. Typically the liquid jet is pulsed by oscillating the velocity of the jet mechanically or by hydrodynamic and acoustic interactions. The invention may be applied to enhance cavitation erosion in a cavitating liquid jet, or to modulate the velocity of a liquid jet exiting in a gas, causing it to form into discrete slugs, thereby producing an intermittent percussive effect.

Somoza discloses reducing the particle size of energetic explosive materials by slurrying the particulate explosive materials in an inert liquid such as water or an aqueous solution, and subjecting the slurry to intense acoustic cavitation from an ultrasonic generator for a short time. The particulate explosive materials are rapidly ground to a small particle size while minimizing the danger of detonation.

Riedlinger discloses a device for generating sonic signal forms for limiting, preventing or regressing the growth of pathological tissue that comprises an ultrasonic transmission system for transmitting sound waves, focused on the tissue to be treated, by way of a coupling medium. An ultrasonic signal produced at the focus of the system comprises brief pulses having at least one rarefaction phase with a negative sonic pressure amplitude with a value greater than $2\times10^5$ Pa. The ultrasonic signal is radiated with a carrier frequency exceeding 20 kHz, a sonic pulse duration T of less than 100 μs and a pulse recurrence rate of less than 0/(5T). The device produces controlled cavitation in the tissue to be treated.

The patent to Madanshetty discloses the surgical cleaning of a semiconductor wafer through the inducement of cavitation on the surface of the wafer at the location of an adherent particle. Cavitation is induced by focusing two acoustic fields on the surface of the wafer. The two acoustic fields include a cavitation field having relatively low frequency focused on the wafer surface from a direction perpendicular to the wafer and a coaxing field of relatively high frequency focused on the wafer surface from a direction between 0 and 25 degrees from the wafer surface.

Grandia et al. discloses medical noninvasive operations using focused modulated high power ultrasound that generally includes a transmitter for exciting a multifrequency ultrasound wave for causing vaporous cavitation bubbles in a small focal zone of a medical target region. Focused ultrasound can be used for both dissolving tissues as well as causing clots in order to destroy cancerous growths. The multifrequency wave includes an underlying low frequency signal for enabling optimal growth of microbubbles and at least one high frequency signal for enabling a narrow zone of focus of the ultrasound. A cavitation monitor may be provided for sensing a level of cavitation as well as providing feedback to the transmitter. In addition, an imaging system is provided for enabling viewing of the medical target area during the therapy.

It should be understood that the present invention would in fact enhance the functionality of the above patents by providing an array of intersecting acoustic beams in free water space, the acoustic beams being generated at a frequency and range to create a destructive cavitation field around an undesirable remote target.

SUMMARY OF THE INVENTION

Therefore it is an object of this invention to provide a self-defense weapon utilizing acoustic remote cavitation.

Another object of this invention is to provide an underwater self-defense weapon mounted on an underwater support vessel.

Still another object of this invention is to provide an acoustic remote cavitation weapon by generating an array of intersecting acoustic beams.

A still further object of the invention is to provide an acoustic remote cavitation weapon deriving power from an underwater support vessel and generating an array of intersecting acoustic beams at a long range.

Yet another object of this invention is to provide an acoustic remote cavitation self-defense weapon for generating a destructive cavitation in free water space.

In accordance with one aspect of this invention, there is provided a method of generating a predetermined field of cavitation around a remote target in an underwater environment. The method includes the steps of identifying a remote target location, generating at least two acoustic beams, each at a peak power output, from an underwater energy source, and controlling the generated acoustic beams to intersect with each other at the remote target location and thereby create a destructive cavitation field at the intersection of the beams.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
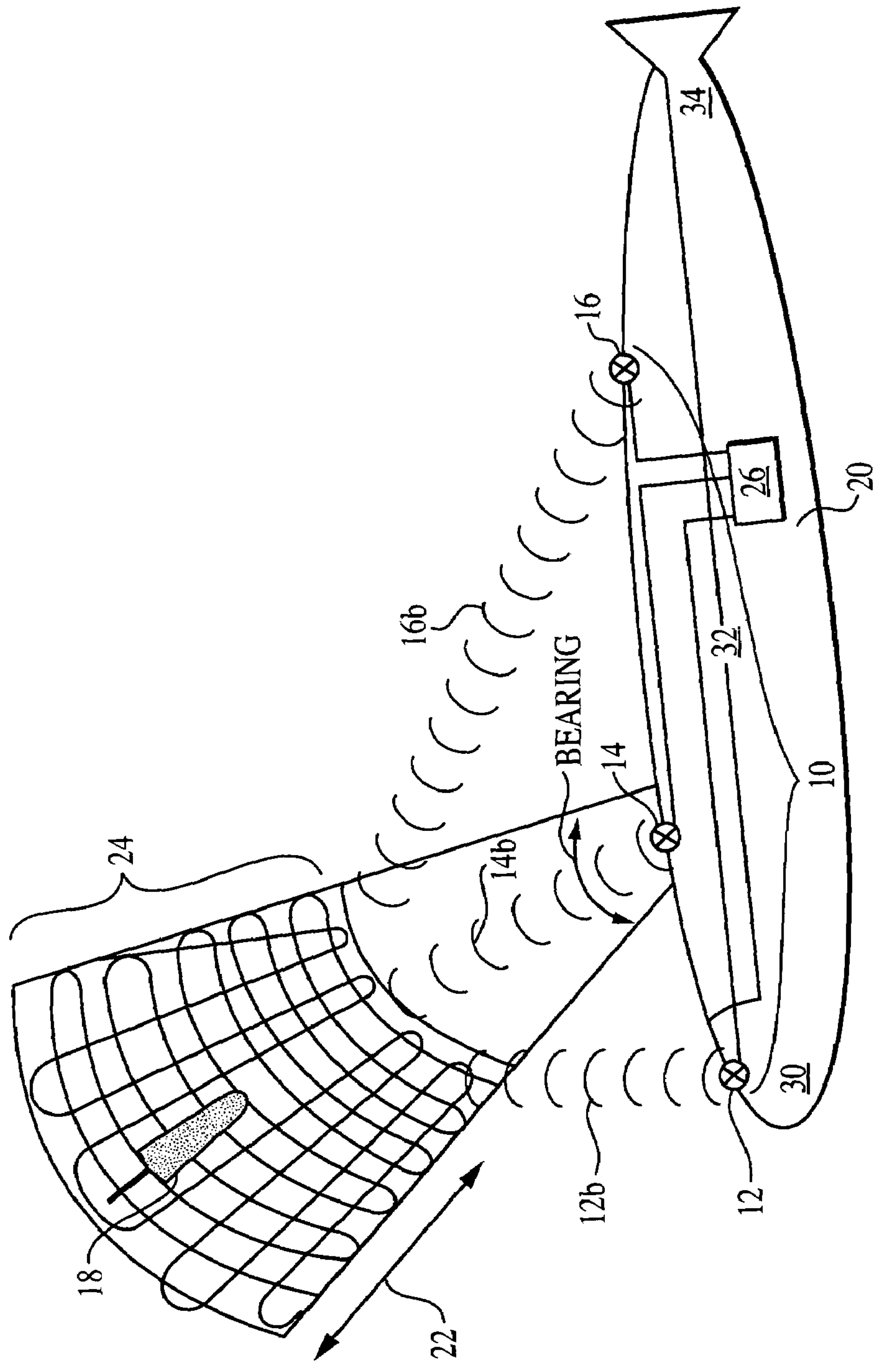
FIG. 1 is perspective view of a self-defense weapon according to the present invention.

In general, the present invention is directed to an environmentally clean self-defense weapon, generally shown in operation in FIG. 1. The weapon 10 includes an array of selectively activated sonar devices 12, 14, 16, that will eliminate or destroy unwanted underwater objects 18 remotely without using explosive materials. It is a characteristic of the present invention that the underwater environment is that of free and open underwater space such as that found in lakes, oceans and other large bodies of water.

The underwater object 18 targeted for destruction is shown generically in FIG. 1 and may include mines, incoming torpedoes, marine fouling barnacles, and emergency rescue operations. It will be understood that the position of the underwater object 18 is not necessarily specifically identifiable, yet is within a range of about 100 meters to about 1 Km from a source vessel such as a submarine 20.

The weapon 10, including the array of sonar devices 12, 14, 16, is mounted to or formed in connection with the submarine 20 or similar underwater vehicle capable of transporting and providing power to the weapon array 10. In the subject of FIG. 1, the weapon array 10, including three sonar devices 12, 14, 16, is shown to be targeting the object 18 located a distance 22 from the submarine 20. The sonar sources 12, 14, 16 of the weapon 10 are mounted on the submarine 20 at predetermined intervals. For example, a first sonar source 12 may be mounted at the nose 30 of the submarine 20, a second sonar source 14 mounted at a mid-section 32 of the submarine 20, and a third sonar source 16 mounted at a tail 34 of the submarine 20. This array spacing and number of sonar sources is by way of example only and will be modified to suit the particular underwater transport source. Regardless of the spacing of the array 10 or number of sonar sources used, the beams 12*b*, 14*b*, 16*b* from the sonar sources 12, 14, and 16, respectively, will be directed to intersect at a cavitating focal point coinciding with the determined location of the target 18. The intersecting beams at the cavitating focal point of the sonar sources will create a destructive cavitation field generally identified at 24 in FIG. 1.

The sonar sources 12, 14, and 16 of the weapon 10 are activated to generate a focused beam at a frequency of 10 KHz to 15 KHz. All calculations for target 18 location, output frequencies, intersecting focal points of the sonar sources 12, 14, 16, and required signals to control "firing" of the sonar sources is by way of an on-board computer 26 connected to the sonar sources.

Any general-purpose active sonar source can be used to assemble a weapon array 10 as in the present invention. The underlying physics is based on the intense heat and high-pressure pulse from the sonar sources 12, 14, and 16 as the damage mechanisms by virtue of the intense acoustic power of the sonar sources. An ensuing cavitation bubble formation and collapse and shock propagation will also inflict damages on underwater objects 18 targeted for removal. The technical drivers are the cavitation lethality on the undesirable objects 18 and the acoustic power of the sonar sources versus range and depth.

Any sonar array can be used in this mode. The stand off distance is the focal length of the array as defined by the intersection of the separate sonar sources 12, 14, 16. A function of physical dimension of the array is that the longer the span of the array along the support member 20, the farther away the standoff or target distance may be.

Historically, an acoustic array is always designed to avoid cavitation. This invention seeks to operate the acoustic array weapon 10 at its peak power output to maximize cavitation at the focal point of the array. The key elements of the operation are: computation of the focal point location and acoustic beamforming to cover the object location.

There are several advantages to the present invention including a lack of environmentally detrimental residues that will be generated. Further, beamforming greatly reduces response time so that more objects can be removed in a given time. Also, the present invention reduces cost per object removed. This concept also enables all sonar to be used as a device to remove undesirable objects. Furthermore, without any explosives and the increased standoff distance from the device, the operating platform of the underwater vessel 20 with the sonar array 10 will not suffer any damage.

Figure 2:
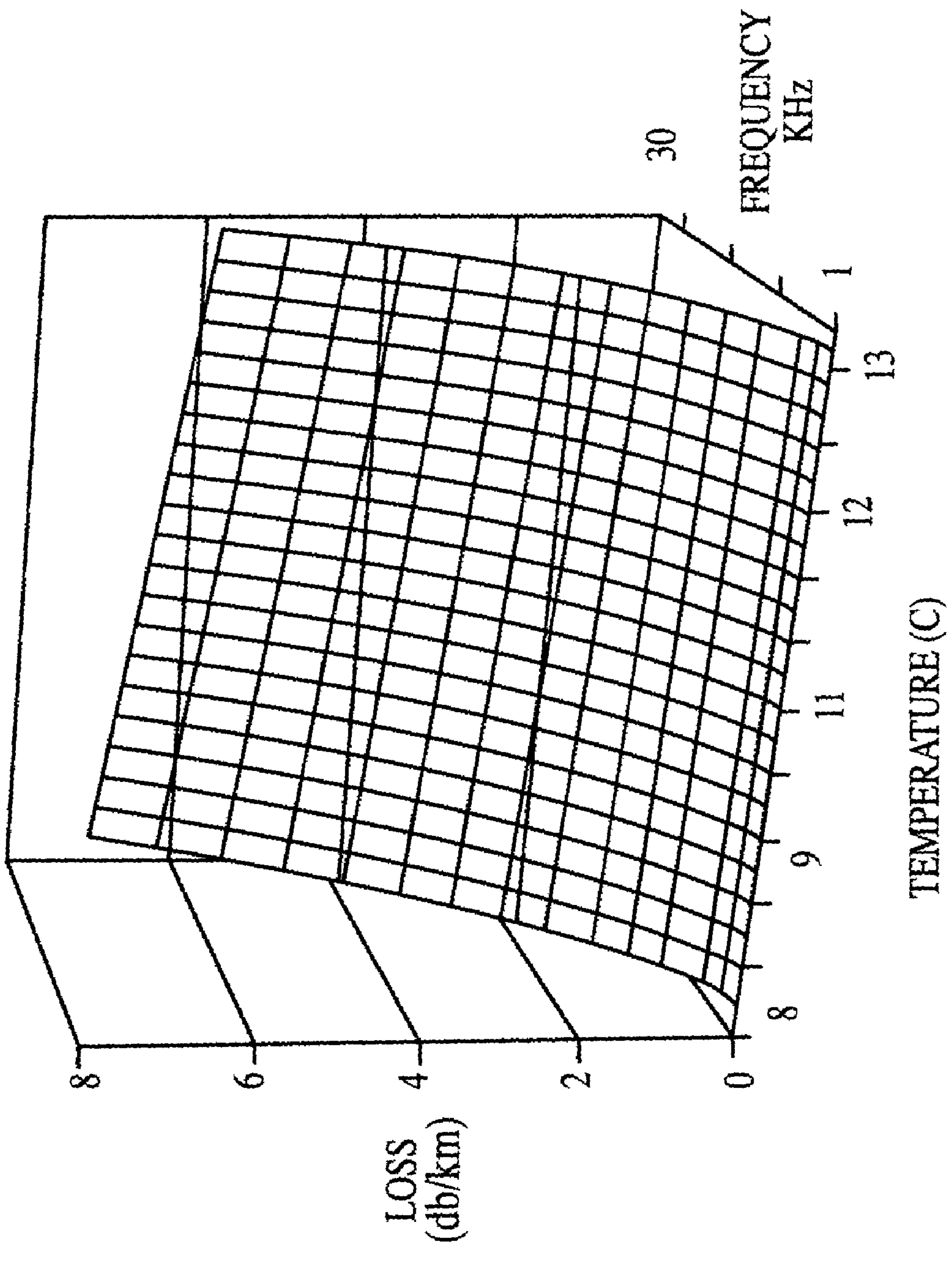
FIG. 2 is graph showing linear and non-linear absorption losses according to a preferred embodiment of the present invention.
Figure 3:
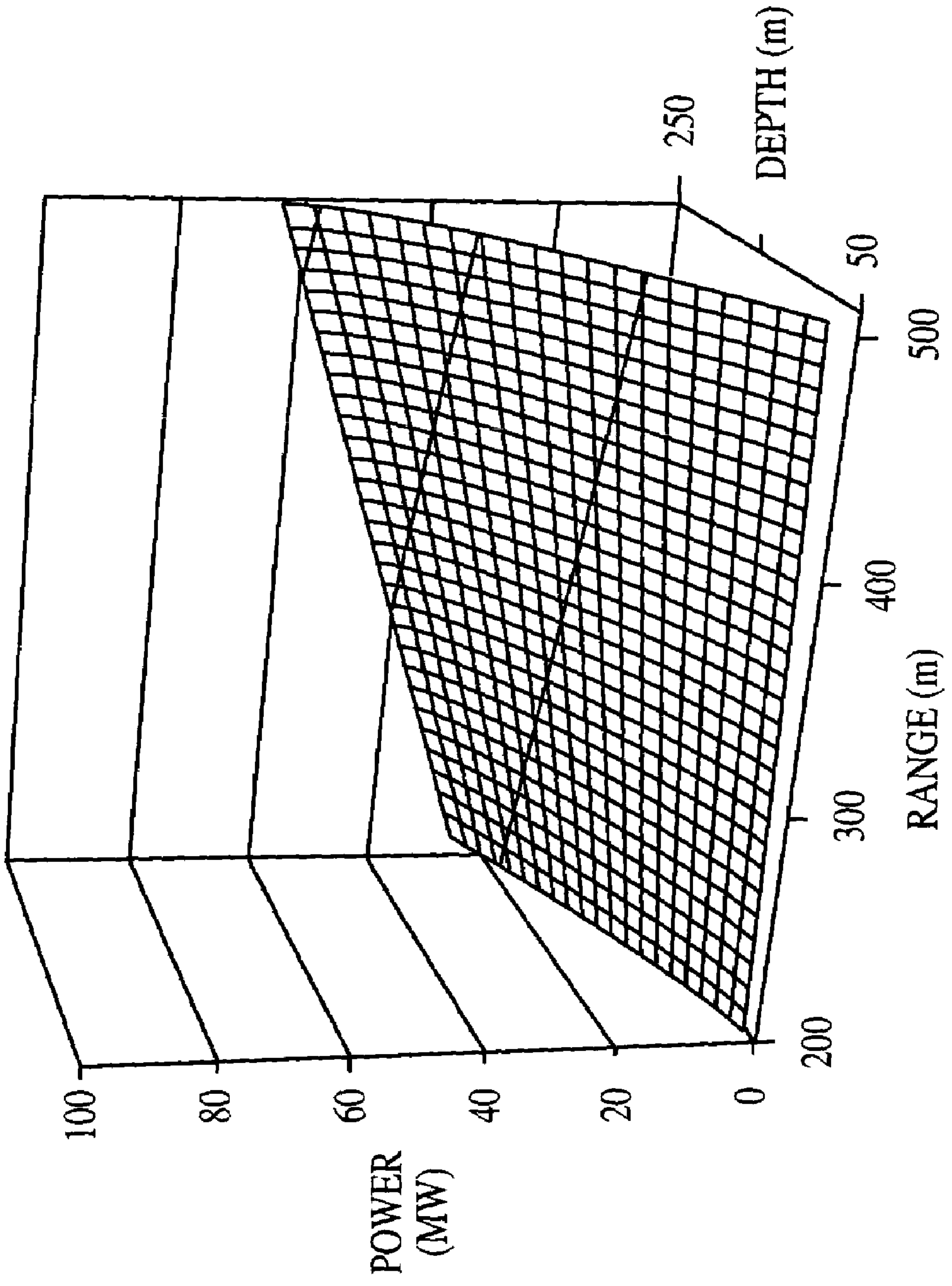
FIG. 3 is a graph showing acoustic power requirement versus range and depth according to a preferred embodiment of the present invention.

FIG. 2 is a graph illustrating linear and non-linear absorption losses over a temperature range of 0 to 13 degrees Celsius and a frequency of 1 to 30 KHz. FIG. 3 is a graph illustrating acoustic power requirement versus range and depth at 30 KHz.

The potential applications are numerous, and include without limitation thereto: mine neutralization; torpedo self-defense, melee close-in encounter; and any sources or communication systems that must be left behind.

In view of the above detailed description, it is anticipated that the invention herein will have far reaching applications other than those of underwater destruction of undesirable objects.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A method of generating a predetermined field of cavitation around a remote target in an underwater environment, said method comprising the steps of:

identifying a remote target in an unconfined underwater location;

generating at least two acoustic beams from an underwater acoustic source; and controlling said at least two generated acoustic beams to intersect with each other at said identified remote target location and whereby a cavitation field is created at said intersection.

2. The method according to claim 1 wherein said remote target location is in the range of 100 m to 1 km from the acoustic source.

3. The method according to claim 1 wherein said remote target location is at least 100 m from the acoustic source.

4. The method according to claim 1 wherein said remote target location is no more than 1 km from the acoustic source.

5. The method according to claim 1 wherein said acoustic beams are generated in a range frequency of from 10 KHz to 15 KHz.

6. The method according to claim 1 wherein said acoustic source is located onboard an underwater support vessel.

7. The method according to claim 1 wherein three acoustic beams are generated.

8. The method according to claim 1 wherein said at least two generated beams are generated to maximize cavitation at said identified remote target location.

9. A method of generating a predetermined field of destructive cavitation around a remote target in an underwater environment, said method comprising the steps of:

identifying a remote target location;

generating an array of intersecting acoustic beams, each beamformer producing a beam at peak power output, from an acoustic source; and controlling said array of intersecting beams to intersect at said identified remote target location and thereby creating the field of destructive cavitation at said intersection.

10. The method according to claim 9 wherein said remote target location is in the range of 100 m to 1 km from the acoustic source.

11. The method according to claim 9 wherein said remote target location is at least 100 m from the acoustic source.

12. The method according to claim 9 wherein said remote target location is no more than 1 km from the acoustic source.

13. The method according to claim 9 wherein said acoustic beams is generated in a frequency range of from 10 KHz to 15 KHz.

14. The method according to claim 9 wherein said acoustic source is located onboard an underwater support vessel.

15. The method according to claim 9 wherein said array includes at least two acoustic beams.

16. A method of generating a predetermined field of destructive cavitation around a remote target in an underwater environment, said method comprising the steps of:

identifying a remote target location;

computing a focal point location about said identified remote target location;

computing beam parameters for said focal point location; and generating at least two acoustic beams whereby cavitation is generated at said focal point location.

* * * * *